US012463358B2

(12) United States Patent
Ashibu

(10) Patent No.: US 12,463,358 B2
(45) Date of Patent: Nov. 4, 2025

(54) CONNECTOR, CONNECTOR ASSEMBLY, AND CONNECTING METHOD

(71) Applicant: Japan Aviation Electronics Industry, Limited, Tokyo (JP)

(72) Inventor: Kenta Ashibu, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 289 days.

(21) Appl. No.: 18/450,834

(22) Filed: Aug. 16, 2023

(65) Prior Publication Data

US 2024/0113453 A1 Apr. 4, 2024

(30) Foreign Application Priority Data

Sep. 29, 2022 (JP) ................................ 2022-156650

(51) Int. Cl.

*H01R 4/48* (2006.01)
*H01R 13/514* (2006.01)
*H01R 13/629* (2006.01)

(52) U.S. Cl.

CPC ............ *H01R 4/48* (2013.01); *H01R 13/514* (2013.01); *H01R 13/629* (2013.01)

(58) Field of Classification Search

None

See application file for complete search history.

(56) References Cited

U.S. PATENT DOCUMENTS

| | | | | |
|---|---|---|---|---|
| 3,993,383 | A * | 11/1976 | Marino | H01R 12/728 439/59 |
| 5,944,553 | A | 8/1999 | Yasui et al. | |
| 8,579,637 | B2 | 11/2013 | Liskow | |
| 10,630,009 | B2 * | 4/2020 | Hashiguchi | H01R 12/613 |
| 10,862,254 | B2 * | 12/2020 | Komoto | H01R 27/02 |
| 2021/0104824 | A1 * | 4/2021 | Hashiguchi | A44C 5/14 |

FOREIGN PATENT DOCUMENTS

JP 2007214087 A 8/2007

* cited by examiner

*Primary Examiner* — Tho D Ta

(74) *Attorney, Agent, or Firm* — MUNCY, GEISSLER, OLDS & LOWE, P.C.

(57) ABSTRACT

A connector includes an insulator forming a conductor-portion placement surface and a pressing portion being retained by the insulator to project from the conductor-portion placement surface in a direction orthogonal to the conductor-portion placement surface and extending toward a predetermined first direction along the conductor-portion placement surface, the pressing portion being elastically deformable in the direction orthogonal to the conductor-portion placement surface, a conductor portion of an electric wire extending from the first direction along the conductor-portion placement surface being disposed between the conductor-portion placement surface and the pressing portion, a connection object being sandwiched between the pressing portion passed through an opening portion of the connection object extending from a second direction opposite to the first direction along the conductor-portion placement surface and the conductor portion of the electric wire.

12 Claims, 8 Drawing Sheets

CONNECTOR, CONNECTOR ASSEMBLY, AND CONNECTING METHOD

BACKGROUND OF THE INVENTION

The present invention relates to a connector, particularly to a connector and a connector assembly that electrically connect a conductor portion of an electric wire to a contact portion exposed on a bottom surface of a sheet type connection object.

The present invention also relates to a connecting method for electrically connecting a conductor portion of an electric wire to a contact portion exposed on a bottom surface of a sheet type connection object.

In recent years, attention has been drawn to so-called smart clothes that can obtain user's biological data such as the heart rate and the body temperature only by being worn by the user. Such smart clothes have an electrode disposed at a measurement site and constituted of a flexible conductor, and when a wearable device serving as a measurement device is electrically connected to the electrode, biological data can be transmitted to the wearable device.

The electrode and the wearable device can be interconnected by, for instance, use of a connector connected to the flexible conductor.

However, when the wearable device is situated away from the measurement site, it is necessary to provide an electric path connecting the electrode disposed at the measurement site to the place where the connector is attached, and if such an electric path is formed from a flexible conductor, this causes higher electric resistance and higher cost.

To interconnect an electrode constituted of a flexible conductor and a wearable device by use of an electric wire that has low electric resistance and is inexpensive, it has been desired to develop a small-sized connector connecting the electric wire to the flexible conductor disposed on a garment.

For instance, JP 2007-214087 A discloses a connector shown in FIG. 19 as a connector used for connecting an electric wire to a flexible conductor. This connector includes a first connector 2 connected to an end of a substrate 1 and a second connector 4 attached to tips of electric wires 3, and the electric wires 3 can be connected to a flexible conductor of the substrate 1 by fitting the second connector 4 to the first connector 2.

However, the first connector 2 and the second connector 4 that are separately attached to the end of the substrate 1 and the tips of the electric wires 3 need to be fitted to each other in order to connect the electric wires 3 to the flexible conductor of the substrate 1, and this causes a larger size of a device; and there is a separable connection portion between the first connector 2 and the second connector 4, which impairs the reliability of electric connection.

SUMMARY OF THE INVENTION

The present invention has been made to overcome the conventional problems as above and aims at providing a connector and a connector assembly that can have a small size while electrically connecting, with high reliability, a conductor portion of an electric wire to a contact portion exposed on a bottom surface of a sheet type connection object.

The present invention also aims at providing a connecting method for electrically connecting a conductor portion of an electric wire to a contact portion exposed on a bottom surface of a sheet type connection object.

A connector according to the present invention is one connecting a conductor portion of an electric wire to a contact portion exposed on a bottom surface of a sheet type connection object, the connector comprising:

an insulator forming at least a part of a conductor-portion placement surface on which the conductor portion of the electric wire is placed; and a pressing portion being retained by the insulator to project from the conductor-portion placement surface in a direction orthogonal to the conductor-portion placement surface and extending toward a predetermined first direction along the conductor-portion placement surface, wherein the pressing portion is elastically deformable in the direction orthogonal to the conductor-portion placement surface, and wherein the conductor portion of the electric wire extending from the first direction along the conductor-portion placement surface is disposed between the conductor-portion placement surface and the pressing portion, and the connection object is sandwiched between the pressing portion passed through an opening portion of the connection object extending from a second direction along the conductor-portion placement surface and the conductor portion of the electric wire, the second direction being an opposite direction from the first direction, whereby the contact portion of the connection object makes contact with and is electrically connected to the conductor portion of the electric wire.

A connector assembly according to the present invention comprises:

the connector;

the connection object; and the electric wire, wherein the connection object includes the contact portion disposed on a bottom surface of an end portion in the first direction of the connection object, and the opening portion disposed adjacent to the contact portion on a second direction side of the contact portion.

A connecting method according to the present invention is one for connecting a conductor portion of an electric wire to a contact portion exposed on a bottom surface of a sheet type connection object, the method comprising:

disposing the conductor portion of the electric wire on a conductor-portion placement surface of a connector, the conductor portion extending from a predetermined first direction toward a second direction that is opposite direction from the first direction, passing a pressing portion through an opening portion of the connection object extending from the second direction along the conductor-portion placement surface, the pressing portion projecting from the conductor-portion placement surface in a direction orthogonal to the conductor-portion placement surface and extending in the first direction, and displacing the connection object toward the second direction with respect to the pressing portion to sandwich the connection object between the conductor portion of the electric wire and the pressing portion, whereby the contact portion of the connection object makes contact with and is electrically connected to the conductor portion of the electric wire.

DETAILED DESCRIPTION OF THE INVENTION

An embodiment of the present invention is described below based on the accompanying drawings.

Figure 1:
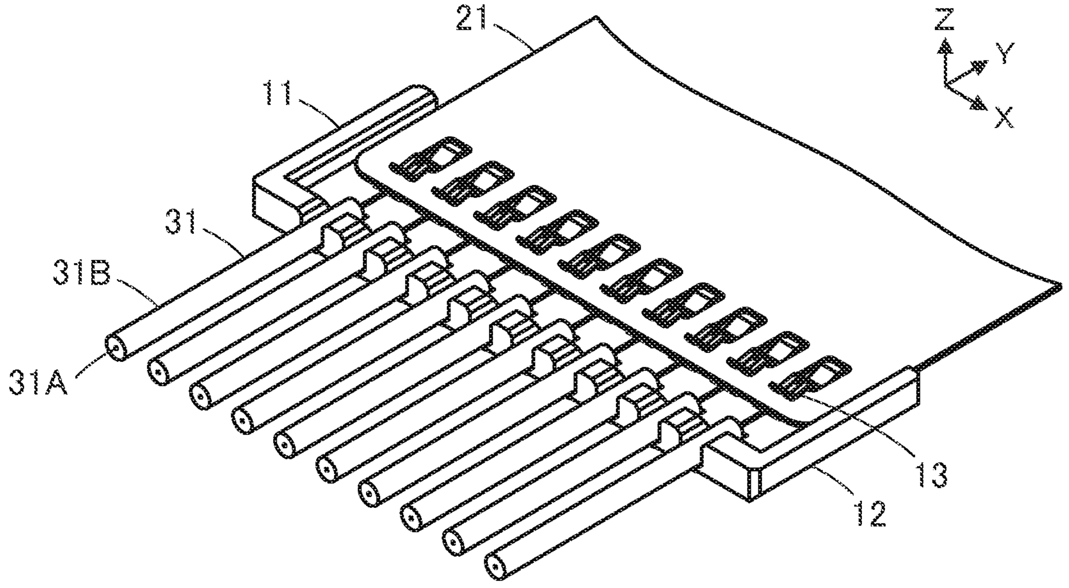
FIG. 1 is a perspective view showing a connector assembly according to an embodiment.

FIG. 1 shows a connector assembly according to the embodiment. The connector assembly is obtained by connecting conductor portions 31A of a plurality of coated electric wires 31 to a sheet type connection object 21 by means of a connector 11.

The connector 11 includes an insulator 12 of substantially flat plate shape made of an insulating resin material, and a plurality of metal terminals 13 retained by the insulator 12.

The coated electric wires 31 are aligned in a predetermined alignment direction and each extend in a direction orthogonal to the alignment direction in parallel to the surface of the insulator 12 of the connector 11. Each coated electric wire 31 has a structure in which the outer periphery of the conductor portion 31A is covered with an insulating coating portion 31B. With the use of the connector 11, the conductor portions 31A of the plurality of coated electric wires 31 are electrically connected to a plurality of contact portions, which will be described later, exposed on the bottom surface of the connection object 21. The conductor portion 31A of the coated electric wire 31 may be either a so-called solid wire constituted of one conductor or a so-called stranded wire constituted of plural conductors being stranded.

For convenience, the insulator 12 of the connector 11 is defined as extending along an XY plane, the alignment direction of the coated electric wires 31 is referred to as "X direction," the direction in which each coated electric wire 31 extends toward the connector 11 is referred to as "+Y direction," and the direction orthogonal to an XY plane is referred to as "Z direction."

Figure 2:
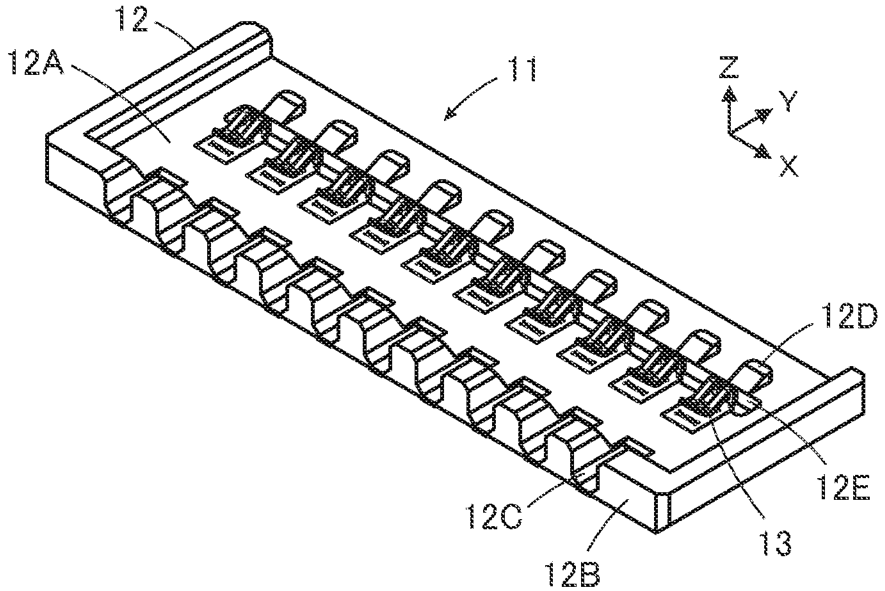
FIG. 2 is a perspective view showing a connector used in the embodiment.
Figure 3:
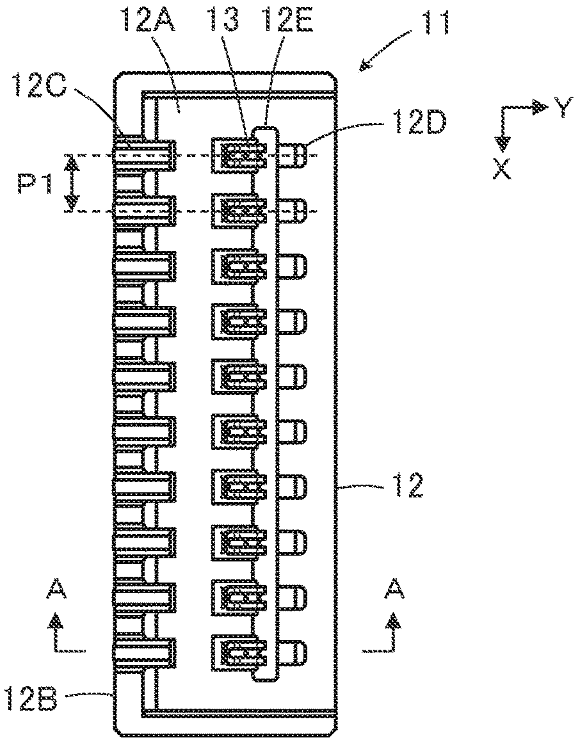
FIG. 3 is a plan view showing the connector used in the embodiment.
Figure 4:
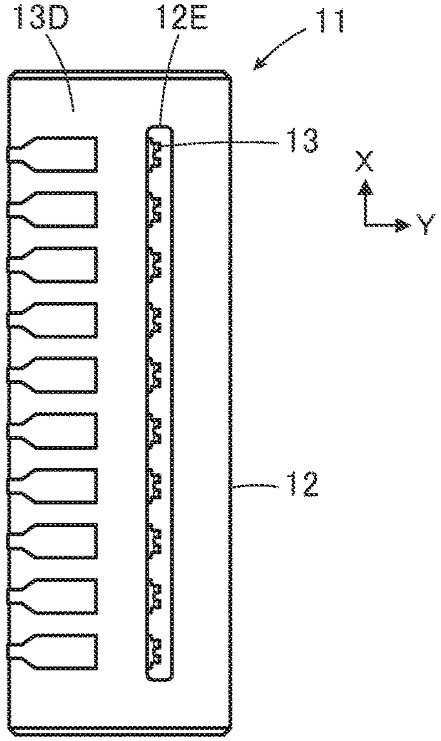
FIG. 4 is a bottom view showing the connector used in the embodiment.

As shown in FIGS. 2 to 4, the insulator 12 of the connector 11 has a rectangular shape extending along an XY plane and elongated in the X direction, and has a flat surface 12A extending along the XY plane and facing the +Z direction.

At each of a −X directional end portion, a +X directional end portion, and a −Y directional end portion of the insulator 12, a wall portion 12B is formed to project in the +Z direction, and at the −Y directional end portion of the insulator 12, a plurality of electric-wire accommodating grooves 12C are formed to be aligned in the X direction. The electric-wire accommodating grooves 12C separately correspond to the coated electric wires 31, and each groove 12C extends in the Y direction across the wall portion 12B, is recessed from the flat surface 12A toward the −Z direction, and has an X directional groove width corresponding to the diameter of the coated electric wire 31.

In addition, a plurality of protrusion portions 12D are formed near a +Y directional end portion of the insulator 12 so as to be aligned in the X direction and project in the +Z direction.

The insulator 12 is provided with a through-hole 12E penetrating the insulator 12 in the Z direction at a position adjacent to the plurality of protrusion portions 12D, aligned in the X direction, on the −Y direction side thereof. The through-hole 12E extends in the X direction over all of the protrusion portions 12D aligned in the X direction.

Further, the plurality of metal terminals 13 are exposed on the flat surface 12A at positions adjacent to the through-hole 12E on the −Y direction side thereof.

As shown in FIG. 3, the electric-wire accommodating grooves 12C, the protrusion portions 12D, and the metal terminals 13 are separately aligned in the X direction with an alignment pitch P1, and when viewed in the Z direction, the electric-wire accommodating groove 12C, the protrusion portion 12D, and the metal terminal 13, which correspond to one another, are arranged on one straight line along the Y direction.

Figure 5:
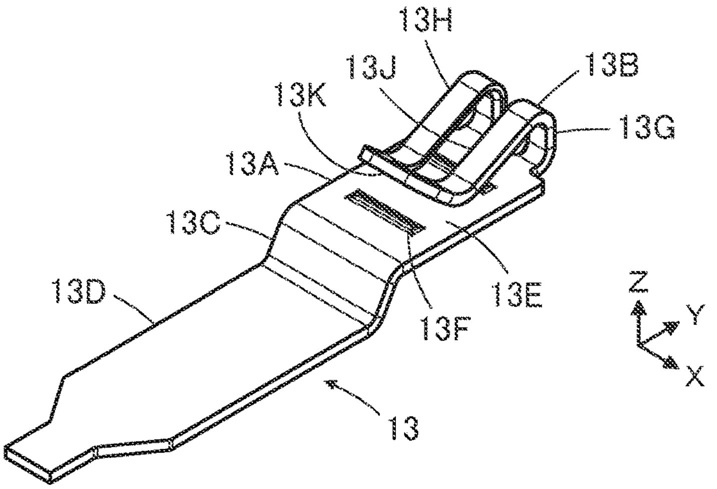
FIG. 5 is a perspective view showing a metal terminal used in the embodiment.
Figure 6:
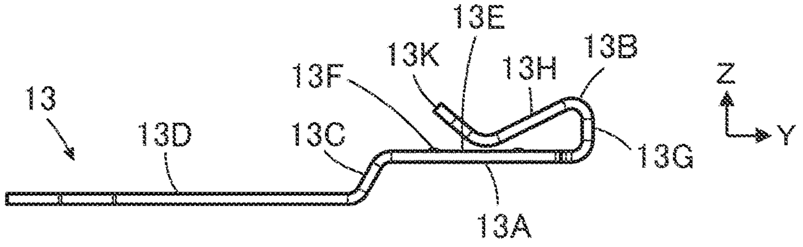
FIG. 6 is a side view showing the metal terminal used in the embodiment.

As shown in FIGS. 5 and 6, the metal terminal 13 is formed of a single bent metal sheet and has a flat plate portion 13A extending along an XY plane, a spring portion 13B connected to a +Y directional end portion of the flat plate portion 13A, and a bottom plate portion 13D connected to a −Y directional end portion of the flat plate portion 13A via a step portion 13C and extending along the XY plane.

The flat plate portion 13A has a top surface 13E facing in the +Z direction and is provided with two projections 13F projecting in the +Z direction from the top surface 13E. The two projections 13F each extend in the X direction and are disposed with a distance therebetween in the Y direction.

The spring portion 13B forms a pressing portion that presses the sheet type connection object 21 against the conductor portion 31A drawn from the coated electric wire 31, and is formed from a rising portion 13G rising toward the +Z direction from the +Y directional end portion of the flat plate portion 13A, and an arm portion 13H bent from a +Z directional end portion of the rising portion 13G and extending in the −Y direction. With the rising portion 13G and the arm portion 13H configured as above, the spring portion 13B has a cantilever shape projecting in the +Z direction from the flat plate portion 13A and extending toward the −Y direction (first direction).

In addition, a slit 13J is formed at a middle part in the X direction of the spring portion 13B so as to extend from a −Z directional end portion of the rising portion 13G connected to the flat plate portion 13A to the vicinity of a −Y directional end portion of the arm portion 13H.

Further, at a −Y directional end portion of the spring portion 13B, a curved portion 13K is formed to be curved toward the +Z direction.

In addition, due to the presence of the step portion 13C, the bottom plate portion 13D is disposed at a position deviated in the −Z direction from the flat plate portion 13A.

Figure 7:
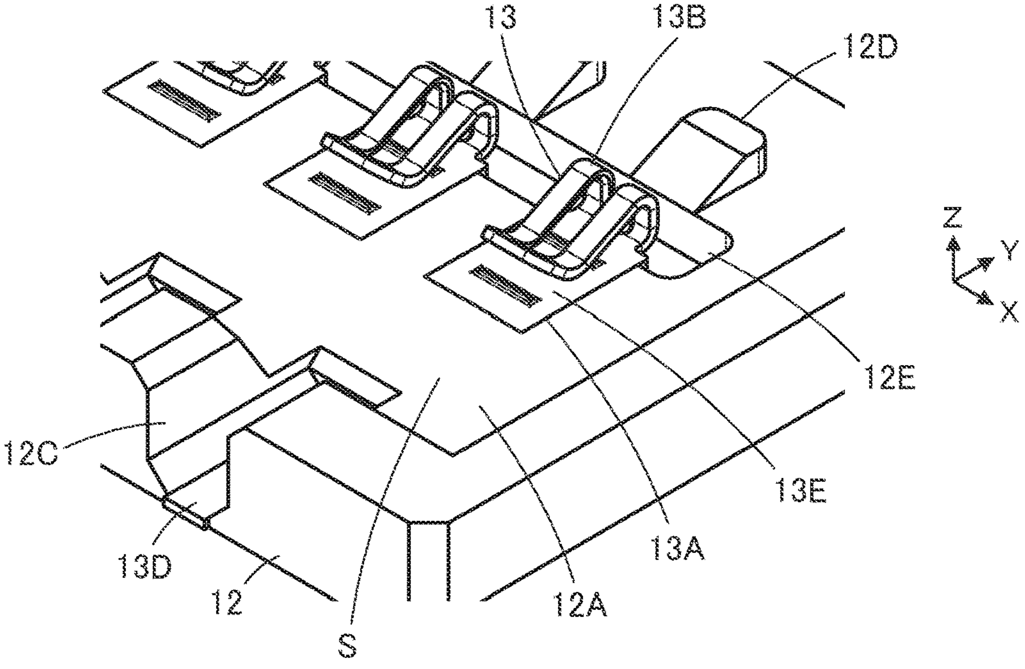
FIG. 7 is an enlarged partial perspective view showing the connector used in the embodiment.
Figure 8:
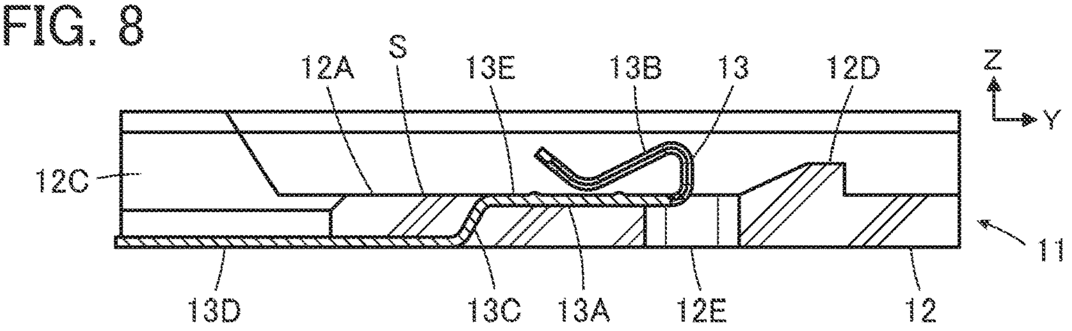
FIG. 8 is a cross-sectional view taken along line A-A in FIG. 3.

As shown in FIGS. 7 and 8, the metal terminal 13 is retained by the insulator 12 such that the top surface 13E of the flat plate portion 13A forms the same plane as the flat surface 12A of the insulator 12 and is exposed toward the +Z direction. The flat surface 12A of the insulator 12 and the top surface 13E of the flat plate portion 13A of the metal terminal 13 form a conductor-portion placement surface S on which the conductor portion 31A of the coated electric wire 31 is to be placed. The conductor-portion placement surface S extends in the X direction (third direction) along the flat surface 12A of the insulator 12.

The spring portion 13B of the metal terminal 13 projects in the +Z direction from the conductor-portion placement surface S, and a +Y directional end portion of the spring portion 13B is situated above the through-hole 12E penetrating the insulator 12 in the Z direction.

The step portion 13C of the metal terminal 13 is embedded in the insulator 12, and the lower surface on the −Z direction side of the bottom plate portion 13D forms the same plane as the lower surface of the insulator 12 and is exposed from the insulator 12 toward the −Z direction. The bottom portion of the electric-wire accommodating groove 12C of the insulator 12 is formed by the bottom plate portion 13D of the metal terminal 13.

Figure 9:
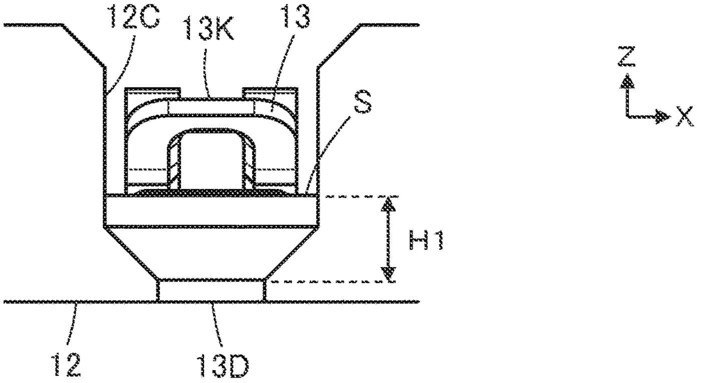
FIG. 9 is an enlarged partial front view showing the connector used in the embodiment.

As shown in FIG. 9, a Z directional height H1 to the conductor-portion placement surface S from a top surface on the +Z directional side of the bottom plate portion 13D of the metal terminal 13 forming the bottom portion of the electric-wire accommodating groove 12C of the insulator 12 is set to be substantially equal to the thickness of the insulating coating portion 31B covering the outer periphery of the conductor portion 31A of the coated electric wire 31. Therefore, when the coated electric wire 31 is accommodated in the electric-wire accommodating groove 12C in the state where the conductor portion 31A is drawn from a tip of the coated electric wire 31, the insulating coating portion 31B is disposed on the bottom plate portion 13D of the metal terminal 13, and the conductor portion 31A drawn from the insulating coating portion 31B is disposed on the conductor-portion placement surface S.

The connector 11 having the thus-configured metal terminals 13 and the insulator 12 that are integrally formed can be produced by, for instance, insert molding.

Figure 10:
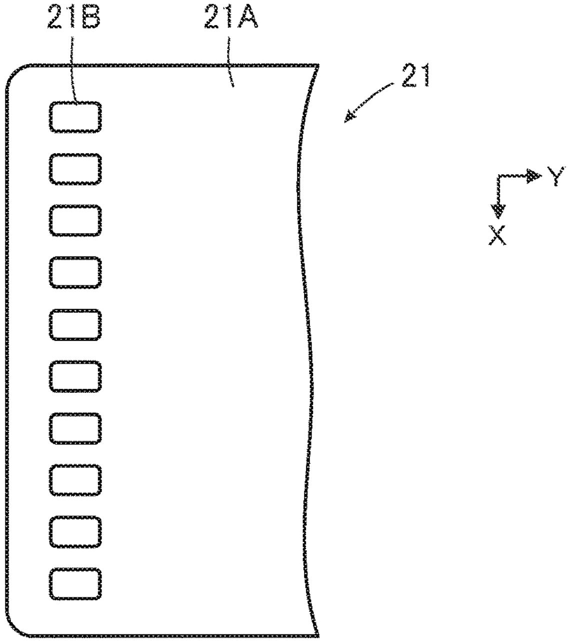
FIG. 10 is a plan view showing a sheet type connection object used in the embodiment.

The sheet type connection object 21 is shown in FIG. 10. The connection object 21 has a multilayer structure in which at least one wiring layer formed from a conductor and a plurality of insulating layers are laminated, for instance.

A top surface, extending along an XY plane and facing in the +Z direction, of the connection object 21 is covered with an insulating layer 21A.

In addition, a plurality of opening portions 21B are formed near a −Y directional end portion of the connection object 21 so as to be aligned in the X direction and penetrate the connection object 21 in the Z direction. The opening portion 21B has such a size that the spring portion 13B of the metal terminal 13 projecting in the +Z direction from the conductor-portion placement surface S of the connector 11 can be passed therethrough in the Z direction.

Figure 11:
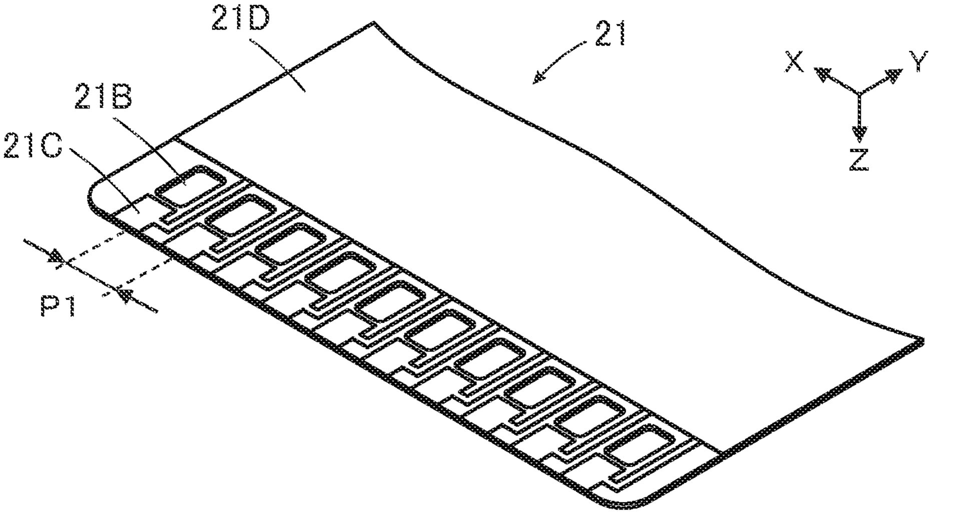
FIG. 11 is a perspective view showing the sheet type connection object used in the embodiment when viewed obliquely from the bottom.

As shown in FIG. 11, a plurality of contact portions 21C aligned in the X direction along the −Y directional end portion of the connection object 21 are exposed on the bottom surface, facing in the −Z direction, of the connection object 21. The contact portions 21C separately correspond to the opening portions 21B, and the opening portions 21B are disposed adjacent to the contact portions 21C on the +Y direction side thereof. In other words, the corresponding contact portion 21C is disposed adjacent to the opening portion 21B on the −Y direction side thereof at the same X directional position as that of the opening portion 21B.

As with the electric-wire accommodating grooves 12C, the protrusion portions 12D, and the metal terminals 13 of the connector 11, the opening portions 21B and the contact portions 21C are separately aligned in the X direction with the alignment pitch P1.

In addition, the contact portions 21C are formed from part of one wiring layer of the connection object 21 and connected to a plurality of wiring portions (not shown) covered with the insulating layer 21D.

Figure 12:
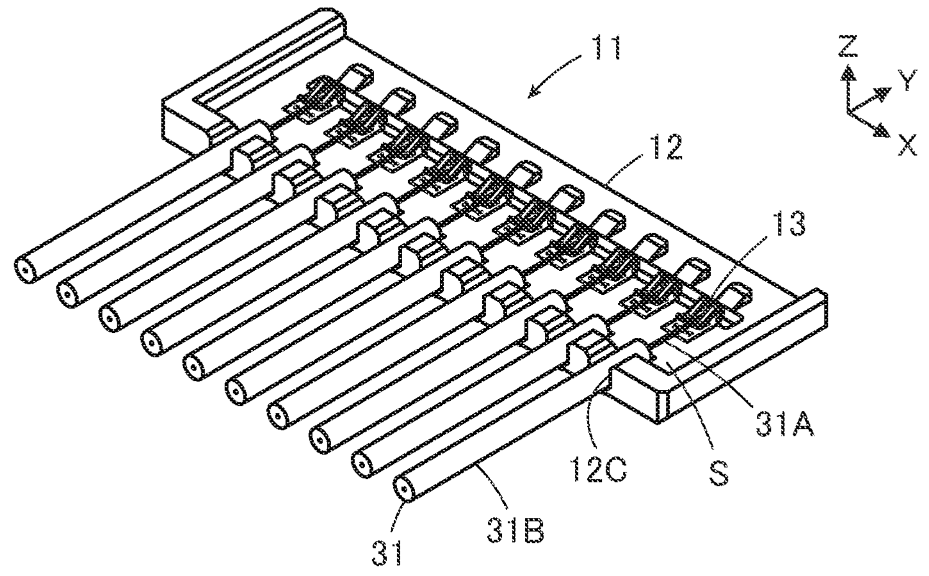
FIG. 12 is a perspective view showing the state where a plurality of electric wires are disposed on the connector.

When the connector assembly is assembled, first, the coated electric wires 31 are aligned in the X direction, the insulating coating portion 31B of each of the coated electric wires 31 is accommodated in the corresponding electric-wire accommodating groove 12C of the insulator 12 of the connector 11, and the conductor portion 31A drawn from the coated electric wire 31 is disposed on the conductor-portion placement surface S of the connector 11 from the −Y direction, as shown in FIG. 12.

Figure 13:
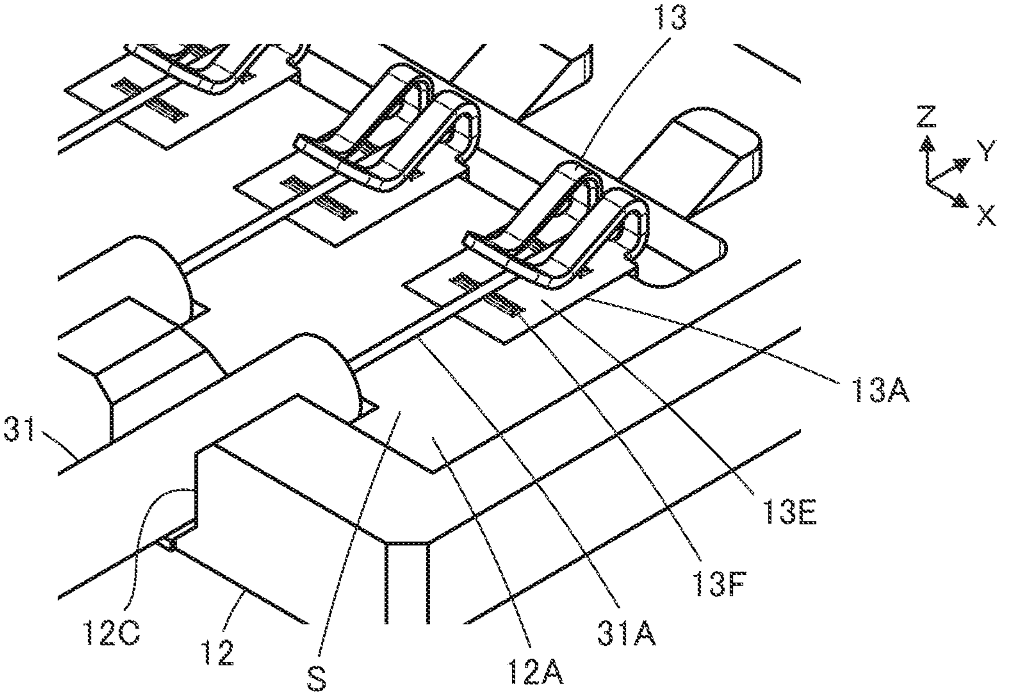
FIG. 13 is an enlarged view of a main part of FIG. 12.

At this time, as shown in FIG. 13, the conductor portion 31A extends toward the +Y direction on the conductor-portion placement surface S formed by the flat surface 12A of the insulator 12 and the top surface 13E of the flat plate portion 13A of the metal terminal 13, and is disposed on the two protrusions 13F of the metal terminal 13.

Figure 14:
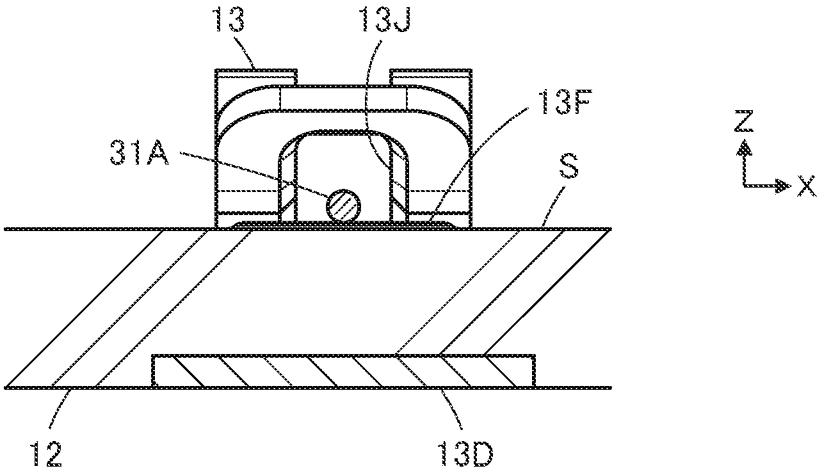
FIG. 14 is an enlarged partial cross-sectional front view showing the connector on which a conductor portion of the electric wire is disposed.

In addition, as shown in FIG. 14, the conductor portion 31A is disposed between the conductor-portion placement surface S and the spring portion 13B in the state where the conductor portion 31A penetrates, in the Y direction, the slit 13J formed in the spring portion 13B of the metal terminal 13.

Figure 15:
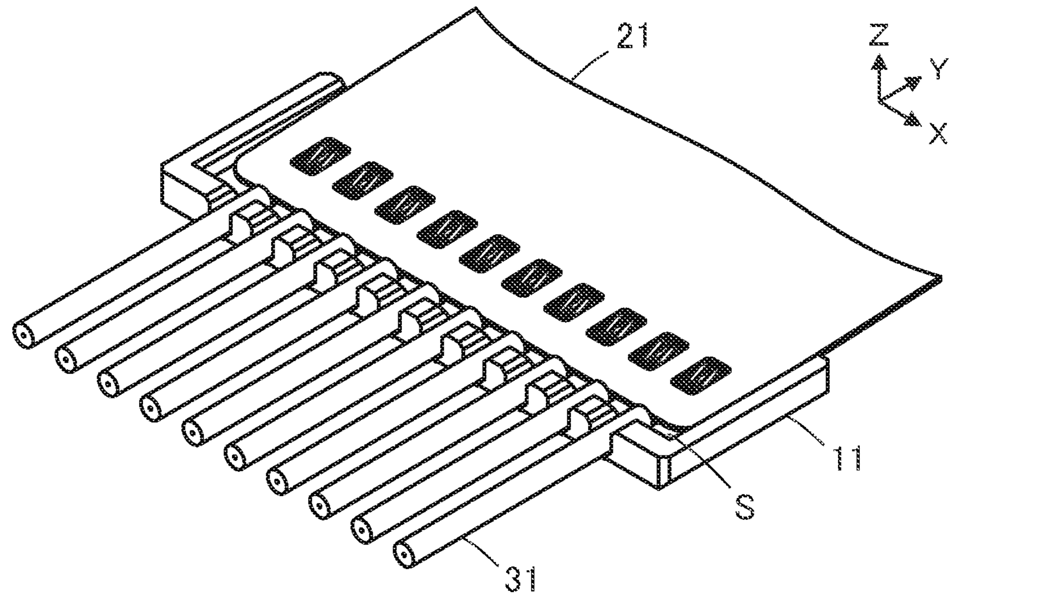
FIG. 15 is a perspective view showing the state where the sheet type connection object is disposed on the connector.
Figure 16:
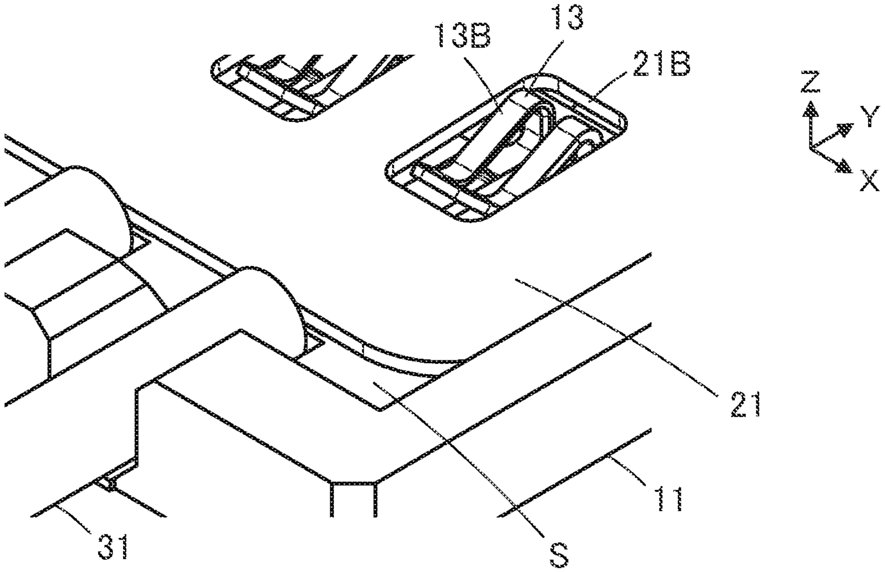
FIG. 16 is an enlarged view of a main part of FIG. 15.

Next, as shown in FIG. 15, the connection object 21 is disposed on the connector 11 in the state where the bottom surface of the sheet type connection object 21 extending from the +Y direction (second direction) toward the conductor-portion placement surface S of the connector 11 faces the conductor-portion placement surface S. As shown in FIG. 16, the connection object 21 is positioned with respect to the connector 11 such that the opening portions 21B are separately situated right above the spring portions 13B of the metal terminals 13 of the connector 11.

Figure 17:
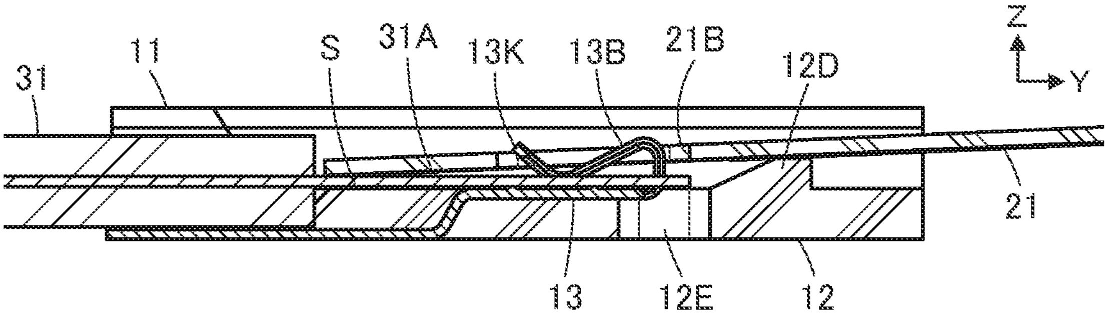
FIG. 17 is a cross-sectional side view showing the state where the sheet type connection object is disposed on the connector.

At this time, as shown in FIG. 17, a part of the connection object 21 on the +Y direction side of the opening portion 21B makes contact with the top side of the protrusion portion 12D of the insulator 12 of the connector 11, while a part of the connection object 21 on the −Y direction side of the opening portion 21B is situated on the conductor portion 31A disposed on the conductor-portion placement surface S.

In addition, the curved portion 13K formed at the −Y directional end portion of the spring portion 13B of the metal terminal 13 of the connector 11 and curved toward the +Z direction is situated on the +Z direction side of the connection object 21 through the opening portion 21B of the connection object 21.

Figure 18:
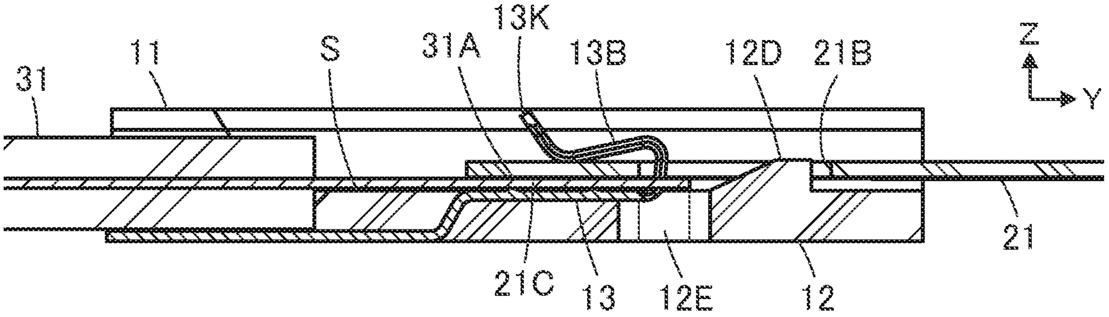
FIG. 18 is a cross-sectional side view showing the connector assembly according to the embodiment.
Figure 19:
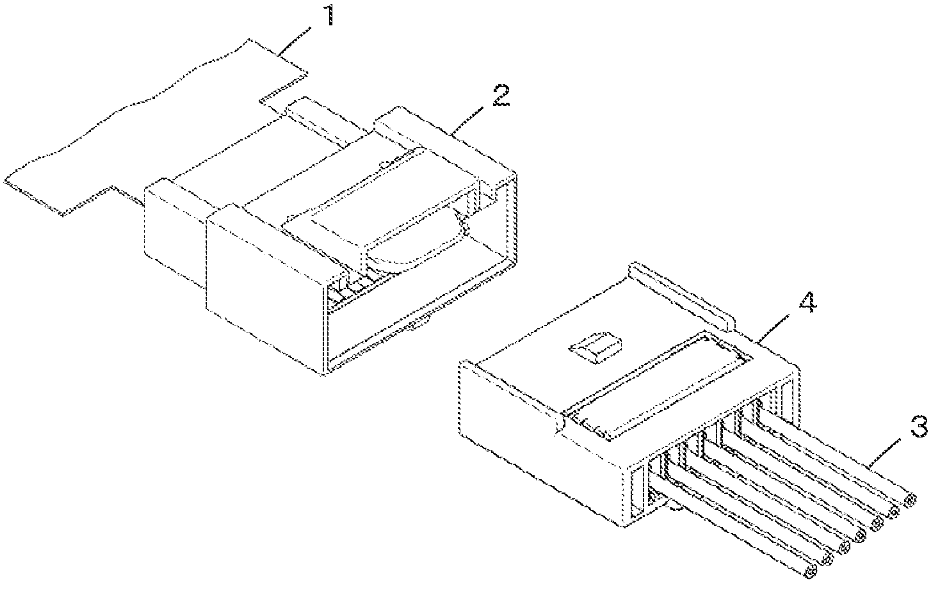
FIG. 19 PRIOR ART
FIG. 19 is a perspective view showing a conventional connector.

By pulling the connection object 21 in the +Y direction in this state, the connection object 21 is displaced in the +Y direction relatively to the connector 11 as shown in FIG. 18. Here, since the curved portion 13K of the spring portion 13B of the metal terminal 13 of the connector 11 is situated on the +Z direction side of the connection object 21 through the opening portion 21B, a part, adjacent to the −Y direction side of the opening portion 21B, of the connection object 21 displaced in the +Y direction with respect to the spring portion 13B pushes and spread the spring portion 13B and enters the −Z directional side of the spring portion 13B.

Consequently, the connection object 21 is sandwiched between the spring portion 13B passed through the opening portion 21B and the conductor portion 31A disposed on the conductor-portion placement surface S, and the contact portion 21C exposed on the bottom surface of the connection object 21 makes contact with the conductor portion 31A with predetermined contact pressure by the elastic force of the spring portion 13B and is electrically connected to the conductor portion 31A.

When the connection object 21 is displaced in the +Y direction, the opening portion 21B of the connection object 21 moves to the position of the protrusion portion 21D of the insulator 12 of the connector 11, and the protrusion portion 12D is inserted in the opening portion 21B.

Thus, the assembling operation of the connector assembly is completed.

The connector 11 has a simple configuration in which the plurality of metal terminals 13 are retained by the insulator 12 of substantially flat plate shape, and this makes it possible to obtain the thin connector 11 and the thin connector assembly.

Note that since the conductor portion 31A drawn from the coated electric wire 31 is disposed between the conductor-portion placement surface S and the spring portion 13B in the state where the conductor portion 31A penetrates the slit 13J formed in the spring portion 13B of the metal terminal 13, positional deviation of the conductor portion 31A with respect to the metal terminal 13 can be prevented, and further, the conductor portion 31A is prevented from making contact with and being short-circuited to the adjacent metal terminal 13.

In addition, since the metal terminal 13 is retained by the insulator 12 such that the +Y directional end portion of the spring portion 13B is situated above the through-hole 12E of the insulator 12, one can visually check from the −Z direction side of the connector 11 through the through-hole 12E that a +Y directional end portion of the conductor portion 31A of the coated electric wire 31 penetrates the slit 13J of the spring portion 13B of the metal terminal 13 as shown in FIGS. 17 and 18. Thus, the reliability of connection of the plurality of coated electric wires 31 to the connection object 21 can be improved.

While the plurality of metal terminals 13 are retained by the insulator 12 by insert molding in the embodiment above, the invention is not limited thereto, and the plurality of metal terminals 13 may also be retained by the insulator 12 by, for example, press-fitting.

In addition, while the spring portion 13B of the metal terminal 13 retained by the insulator 12 forms a pressing portion that presses the sheet type connection object 21 against the conductor portion 31A of the coated electric wire 31 in the embodiment above, the invention is not limited thereto, and the connection object 21 may be pressed against the conductor portion 31A of the coated electric wire 31 by use of a pressing portion of cantilever shape integrally formed with the insulator 12 with an insulating resin material constituting the insulator 12.

As the sheet type connection object 21, either a flexible substrate or a rigid substrate may be used.

In the embodiment above, after the conductor portions 31A of the plurality of coated electric wires 31 are disposed on the conductor-portion placement surface S of the connector 11 from the −Y direction, the connection object 21 is disposed on the connector 11 such that the plurality of opening portions 21B of the connection object 21 are situated right above the spring portions 13B of the plurality of metal terminals 13 of the connector 11, and the connection object 21 is pulled in the +Y direction, whereby the plurality of contact portions 21C exposed on the bottom surface of the connection object 21 are electrically connected to the conductor portions 31A of the plurality of coated electric wires 31. Therefore, even when a flexible substrate is used as the connection object 21, it is not necessary to reinforce the flexible substrate with a reinforcing plate or the like, and a plurality of contact portions of the flexible substrate can be electrically connected to the conductor portions 31A of the plurality of coated electric wires 31 with high reliability.

In addition, when the insulator 12 of the connector 11 is made of a material having flexibility such as a rubber material, and a flexible substrate is used as the connection object 21, a connector assembly that is deformable along the alignment direction of the plurality of coated electric wires 31 can also be configured, for instance.

While the conductor portions 31A of the plurality of coated electric wires 31 are separately connected to the contact portions 21C of the connection object 21 in the embodiment above, the invention is not limited thereto, and a connector assembly may be configured such that the conductor portion 31A of one coated electric wire 31 is connected to the contact portion 21C of the connection object 21 in the same manner.

While the coated electric wire 31 is used as an electric wire connected to the connection object 21, an electric wire constituted only of the conductor portion 31A whose outer periphery is not covered with the insulating coating portion 31B may be connected to the connection object 21.

What is claimed is:

1. A connector connecting a conductor portion of an electric wire to a contact portion exposed on a bottom surface of a sheet type connection object, the connector comprising:

an insulator forming at least a part of a conductor-portion placement surface on which the conductor portion of the electric wire is placed; and a pressing portion being retained by the insulator to project from the conductor-portion placement surface in a direction orthogonal to the conductor-portion placement surface and extending toward a predetermined first direction along the conductor-portion placement surface, wherein the pressing portion is elastically deformable in the direction orthogonal to the conductor-portion placement surface, and wherein the conductor portion of the electric wire extending from the first direction along the conductor-portion placement surface is disposed between the conductor-portion placement surface and the pressing portion, and the connection object is sandwiched between the pressing portion passed through an opening portion of the connection object extending from a second direction along the conductor-portion placement surface and the conductor portion of the electric wire, the second direction being an opposite direction from the first direction, whereby the contact portion of the connection object makes contact with and is electrically connected to the conductor portion of the electric wire.

2. The connector according to claim 1, further comprising a metal terminal retained by the insulator, wherein the metal terminal includes a flat plate portion extending along the conductor-portion placement surface, and a spring portion of cantilever shape projecting in a direction orthogonal to the flat plate portion from an end portion in the second direction of the flat plate portion and extending toward the first direction, wherein a top surface of the flat plate portion along with the insulator forms the conductor-portion placement surface, and wherein the spring portion forms the pressing portion.

3. The connector according to claim 2, wherein the spring portion has a slit extending from a connection portion between the spring portion and the flat plate portion toward the first direction, and wherein the conductor portion of the electric wire is disposed between the conductor-portion placement surface and the pressing portion in a state where the conductor portion penetrates the slit.

4. The connector according to claim 2, wherein the flat plate portion has at least one projection projecting in the direction orthogonal to the flat plate portion and making contact with the conductor portion of the electric wire.

5. The connector according to claim 2, wherein an end portion of the spring portion in the first direction is curved toward the direction orthogonal to the flat plate portion.

6. The connector according to claim 2, wherein the metal terminal is formed in the insulator by insert molding.

7. The connector according to claim 1, wherein in a state where the pressing portion is passed through the opening portion of the connection object, the contact portion of the connection object displaced toward the second direction with respect to the pressing portion makes contact with the conductor portion of the electric wire.

8. The connector according to claim 7, wherein the insulator has a protrusion portion disposed to be separate from the pressing portion in the second direction and projecting in the direction orthogonal to the conductor-portion placement surface, and wherein the protrusion portion is inserted in the opening portion of the connection object displaced toward the second direction with respect to the pressing portion.

9. The connector according to claim 1, wherein the insulator has an electric-wire accommodating groove formed at an end portion of the insulator in the first direction and accommodating the electric wire.

10. The connector according to claim 1, wherein the conductor-portion placement surface extends in a third direction orthogonal to the first direction and the second direction, wherein the connector includes a plurality of pressing portions aligned in the third direction and each retained by the insulator, the plurality of pressing portions each comprising the pressing portion, and wherein conductor portions of a plurality of electric wires are electrically connected to a plurality of contact portions of the connection object by the plurality of pressing portions, the conductor portions of the plurality of electric wires each comprising the conductor portion of the electric wire, the plurality of contact portions each comprising the contact portion.

11. A connector assembly comprising:

the connector according to claim 1;

the connection object; and the electric wire, wherein the connection object includes the contact portion disposed on a bottom surface of an end portion in the first direction of the connection object, and the opening portion disposed adjacent to the contact portion on a second direction side of the contact portion.

12. A connecting method for connecting a conductor portion of an electric wire to a contact portion exposed on a bottom surface of a sheet type connection object, the method comprising:

disposing the conductor portion of the electric wire on a conductor-portion placement surface of a connector, the conductor portion extending from a predetermined first direction toward a second direction that is opposite direction from the first direction, passing a pressing portion through an opening portion of the connection object extending from the second direction along the conductor-portion placement surface, the pressing portion projecting from the conductor-portion placement surface in a direction orthogonal to the conductor-portion placement surface and extending in the first direction, and displacing the connection object toward the second direction with respect to the pressing portion to sandwich the connection object between the conductor portion of the electric wire and the pressing portion, whereby the contact portion of the connection object makes contact with and is electrically connected to the conductor portion of the electric wire.

* * * * *